United States Patent
Belenky

(10) Patent No.: US 9,054,877 B2
(45) Date of Patent: Jun. 9, 2015

(54) DATA EXPANSION USING AN APPROXIMATE METHOD

(75) Inventor: Yaacov Belenky, Maaleh Adumim (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 183 days.

(21) Appl. No.: 13/578,705

(22) PCT Filed: Sep. 21, 2010

(86) PCT No.: PCT/IB2010/054257
§ 371 (c)(1),
(2), (4) Date: Aug. 30, 2012

(87) PCT Pub. No.: WO2011/114197
PCT Pub. Date: Sep. 22, 2011

(65) Prior Publication Data
US 2012/0321085 A1 Dec. 20, 2012

(30) Foreign Application Priority Data
Mar. 17, 2010 (IL) .......................................... 204565

(51) Int. Cl.
*G06F 21/00* (2013.01)
*H04L 9/32* (2006.01)
*H04L 9/30* (2006.01)

(52) U.S. Cl.
CPC ............ *H04L 9/3263* (2013.01); *H04L 9/3093* (2013.01)

(58) Field of Classification Search
CPC ..... H04L 9/3093; H04L 9/3263; H04L 9/302; H04L 9/0861; H04L 9/3026; H04L 9/30; H04L 9/3252; H04L 9/083; H04L 9/3226; H04L 2209/20; H04L 2209/26; H04L 2209/601; G06F 21/72

USPC ......... 380/44–47, 28–30, 259–260, 262, 264, 380/268–269; 713/172–175
See application file for complete search history.

(56) References Cited

U.S. PATENT DOCUMENTS 4,405,829 A 9/1983 Rivest et al.
5,201,000 A * 4/1993 Matyas et al. .................. 380/30
(Continued)

FOREIGN PATENT DOCUMENTS

WO    WO 03/050998 A1    6/2003
WO    WO 2007/135520 A2    11/2007
(Continued)

OTHER PUBLICATIONS

Google Definition for scatter, retrieved on Sep. 10, 2014.*
Transmittal of International Search Report and Written Opinion of the International Searching Authority, Feb. 10, 2011.
A.K. Lenstra et al., "Factoring Polynomials With Rational Coefficients" Mathematische Annalen 261 pp. 515-534 (Springer Verlag 1982).

*Primary Examiner* — Eleni Shiferaw
*Assistant Examiner* — Hilary Branske
(74) *Attorney, Agent, or Firm* — Husch Blackwell LLP

(57) ABSTRACT

A method for computation is described, the method including configuring a processor to expand input seed values into respective output data values using an approximated expansion process such that the output data values are not guaranteed to satisfy a required output data criterion, selecting a seed value so that an output data value generated by the processor by application of the approximated expansion process to the selected seed value will yield an output data value that satisfies the required output data criterion, and storing the selected seed value in a non-volatile memory to be accessed by the processor. Related apparatus and systems are also described.

14 Claims, 2 Drawing Sheets

(56) References Cited

U.S. PATENT DOCUMENTS

| | | |
|---|---|---|
| 6,724,843 B1 | 4/2004 | Clarkson et al. |
| 6,959,085 B1 | 10/2005 | Hoffstein et al. |
| 7,340,606 B2 | 3/2008 | Belenky et al. |
| 8,307,210 B1 * | 11/2012 | Duane .......................... 713/172 |
| 2002/0154768 A1 | 10/2002 | Lenstra |
| 2006/0112049 A1 | 5/2006 | Mehrotra et al. |
| 2006/0176971 A1 | 8/2006 | Nissani (Nissensohn) |
| 2006/0256888 A1 | 11/2006 | Nissani (Nissensohn) |
| 2007/0121753 A1 | 5/2007 | McNamara et al. |
| 2007/0201632 A1 | 8/2007 | Ionescu |
| 2009/0110120 A1 | 4/2009 | McNamara et al. |
| 2009/0196379 A1 | 8/2009 | Gan et al. |

FOREIGN PATENT DOCUMENTS

| | | |
|---|---|---|
| WO | WO 2007/139237 A1 | 12/2007 |
| WO | WO 2008/007802 A2 | 1/2008 |
| WO | WO 2008/026036 A2 | 3/2008 |
| WO | WO 2008/029819 A2 | 3/2008 |
| WO | WO 2008/032849 A1 | 3/2008 |
| WO | WO 2008/040716 A1 | 4/2008 |
| WO | WO 2008/040906 A1 | 4/2008 |
| WO | WO 2008/047735 A2 | 4/2008 |
| WO | WO 2008/047737 A2 | 4/2008 |

* cited by examiner

DATA EXPANSION USING AN APPROXIMATE METHOD

RELATED APPLICATION INFORMATION

The present application is a 35 USC §371 application of PCT/IB2010/054257, filed on 21 Sep. 2010 and entitled "Data Expansion Using An Approximate Method", which was published in the English language with International Publication Number WO 2011/114197, and which claims the benefit of priority from IL Patent Application IL 204565 of NDS Limited, filed 17 Mar. 2010.

FIELD OF THE INVENTION

The present invention relates generally to computational devices and methods, and specifically to data encoding and expansion.

BACKGROUND OF THE INVENTION

Lattice basis reduction methods attempt to find the shortest vector basis for a multi-dimensional lattice. These methods are important in cryptography, as well as in other applications of computational number theory.

One of the most popular methods of lattice basis reduction is the Lenstra-Lenstra-Lovasz (LLL) method, which was first described by Lenstra et al., in "Factoring Polynomials with Rational Coefficients," *Mathematische Annalen* 261(4), pages 515-534 (1982), which is incorporated herein by reference. The LLL method (also referred to as the LLL algorithm) is guaranteed to produce a reduced, nearly orthogonal vector basis for a given lattice in polynomial time.

U.S. Pat. No. 7,340,606, whose disclosure is incorporated herein by reference, describes a method for producing a digital certificate using a public/private key pair. The keys are based on a pair of prime numbers p and q and a resulting modulus n that are generated by expanding a seed s. In one embodiment, the seed is expanded by building a lattice with a certain set of basis vectors, and then using the LLL algorithm to find another, shorter basis that is close to the shortest basis for the lattice. The prime number q is derived from the coordinates of the vectors in this shorter basis.

SUMMARY OF THE INVENTION

Embodiments of the present invention that are described hereinbelow provide methods and apparatus that can be used to encode a data value compactly for storage in the form of a seed value, and then expand the seed value to generate the data value using only limited computational resources.

There is therefore provided, in accordance with an embodiment of the present invention, apparatus for computation, including a processor, which is configured to expand input seed values into respective output data values using an approximated expansion process such that the output data values are not guaranteed to satisfy a required output data criterion. A non-volatile memory is programmed to store a seed value, which is selected so that an output data value generated by the processor by application of the approximated expansion process to the stored seed value yields an output data value that satisfies the required output data criterion.

In some embodiments, the approximated expansion process includes finding a vector basis of a lattice using the seed value, and deriving the output data value from the vector basis. The approximated expansion process may find the vector basis by applying a modified LLL algorithm to the lattice, wherein the modified LLL algorithm does not use vector swapping.

In some embodiments, the output data value is at least a part of a cryptographic key, and the processor is configured to perform a cryptographic operation on a data item using the cryptographic key. The cryptographic operation may include generating a digital certificate for authenticating the apparatus, wherein the stored seed value is selected so that the output data value is a prime number of a predetermined length.

There is also provided, in accordance with an embodiment of the present invention, a method for computation, including configuring a processor to expand input seed values into respective output data values using an approximated expansion process such that the output data values are not guaranteed to satisfy a required output data criterion. A seed value is selected so that an output data value generated by the processor by application of the approximated expansion process to the selected seed value will yield an output data value that satisfies the required output data criterion. The selected seed value is stored in a non-volatile memory to be accessed by the processor.

There is additionally provided, in accordance with an embodiment of the present invention, a system for computation, including a programming unit, which is configured to program a non-volatile memory in a device that includes a processor configured to read an input seed value from the non-volatile memory and to expand the input seed value into an output data value using an approximated expansion process such that the output data value is not guaranteed to satisfy a required output data criterion. A computer is configured to select a seed value so that the output data value generated by the processor by application of the approximated expansion process to the selected seed value will satisfy the required output data criterion, and to cause the programming unit to store the selected seed value in the non-volatile memory of the device.

The present invention will be more fully understood from the following detailed description of the embodiments thereof, taken together with the drawings in which:

DETAILED DESCRIPTION OF EMBODIMENTS

Figure 1:
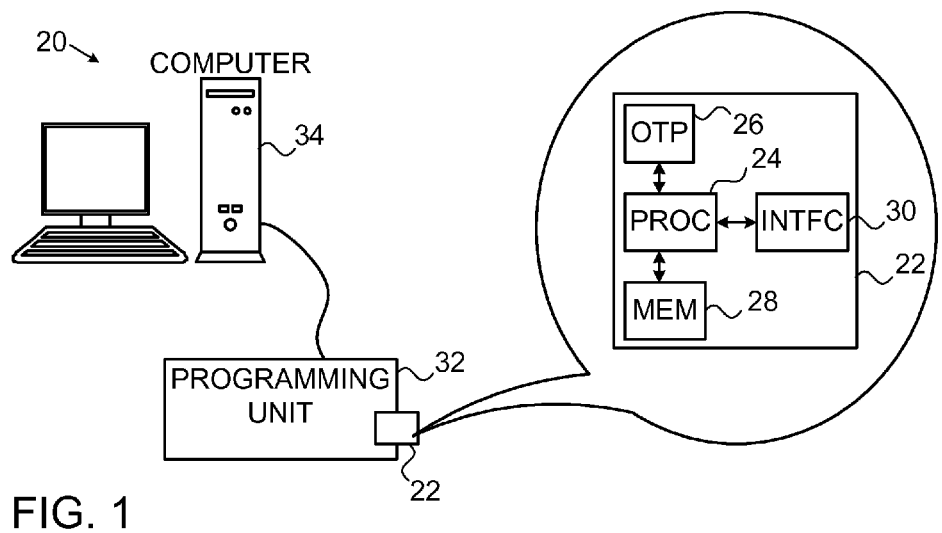
FIG. 1 is a block diagram that schematically illustrates a system for encoding and expanding data values, in accordance with an embodiment of the present invention.

In the embodiments that are described hereinbelow, the principles of the present invention are exemplified by the use of an approximated version of the LLL algorithm, which enables a processor with limited computing resources to expand a small seed value into a much larger output data value. This approximated LLL algorithm will be described in detail hereinbelow, along with the possible use of the output data value in cryptographic operations.

LLL, however, is just one example of an expansion process that may be approximated and used in this manner; and the principles of the present invention may be applied using other algorithms in order to encode large data values using small seeds. Such seeds may be used for compact storage and/or transmission, and may then be expanded using an efficient, approximated process in order to recover the desired output data. Unlike known methods of compression, which rely generally on compact encoding of data patterns, embodiments of the present invention are useful in encoding data with data with high entropy, such as cryptographic information.

The LLL algorithm, as it is commonly implemented, receives a set of vectors forming a basis of a lattice, and uses three types of steps to reduce the lattice to a basis that is nearly the shortest basis:
1. Swap two vectors of the basis.
2. Replace $v_i$ with $v_i + k v_j$, wherein $v_i$ and $v_j$ are two different vectors of the basis, and k is an integer number.
3. Decision steps that decide whether the algorithm is finished, and if not, which step of types 1) and 2) should be performed next.

As noted above, the LLL algorithm is guaranteed to converge to the nearly-shortest basis within polynomial time. The full LLL algorithm may be computationally too demanding, however, for processors having limited computing resources (such as processing bandwidth and memory).

To accommodate such processors, an embodiment of the present invention provides an approximated version of the LLL algorithm. For example, vector swapping may be omitted, and the calculations used in the decision steps may be simplified. As a result, however, the algorithm is no longer guaranteed to produce a correct result, i.e., it may not converge to a basis that is near enough to the shortest basis, and may instead produce an incorrect result or enter an infinite loop.

In order to solve this problem and ensure that the approximated LLL algorithm yields an output data value that meets required criteria, a trial seed value is evaluated offline. In this evaluation, a more powerful computer uses the same approximated version of the LLL algorithm that will be used by the weaker target processor and checks the trial result. If this calculation enters an infinite loop or produces an incorrect result, the computer chooses another trial seed and starts again, until the LLL calculation succeeds. A trial seed of this sort that has resulted in a successful calculation is then stored in non-volatile memory for use by the target processor, thus guaranteeing that when the target processor runs the approximated LLL process, it will succeed in generating an output data value that meets the required criteria.

FIG. 1 is a block diagram that schematically illustrates a system 20 for encoding and expanding data values, in accordance with an embodiment of the present invention. In this embodiment, the system is used in programming a cryptographic device 22, which uses an asymmetric encryption algorithm in a cryptographic operation, such as certificate-based authentication or decryption of encrypted data transmitted by a server (not shown).

For example, device 22 may be used in receiving and decoding encrypted broadcast media transmitted over a communication link by a server. Some or all of the broadcast data may be encrypted using an asymmetric algorithm, and the data are then decrypted by the device using the appropriate private key. Alternatively, because asymmetric decryption is computationally demanding, the broadcast data may be encrypted using a symmetric algorithm. In this case, the key for symmetric decryption of the data may be encrypted using an asymmetric algorithm (and the key may be changed from time to time) and transmitted in encrypted form to the client device. The client device uses its own private key to decrypt the symmetric key and then applies the symmetric key to decrypt the broadcast data in the real time.

An asymmetric algorithm that may be used in this context is the Rivest Shamir Adleman (RSA) algorithm, which is described, for example, in U.S. Pat. No. 4,405,829. A pair of prime numbers, p and q, is used to generate public and private keys, which have the form (n,e) and (n,d), respectively. Here n is referred to as the modulus and e and d are referred to as the exponents. The modulus n is simply the product of the prime numbers: n=pq. The public exponent e is an integer in the range $1 < e < \phi(pq)$, wherein the totient $\phi(pq) = (p-1)(q-1)$. The private exponent d is computed to satisfy the congruence relation $de \equiv 1 \pmod{\phi(pq)}$. The security of encryption typically increases with the length of the modulus that is used. Therefore, it is now common in RSA encryption to use private keys with moduli and exponents that are 1024 bits or even longer.

Device 22 comprises a processor 24, which communicates with a server (or with some other computing device) via a data interface 30. Processor 24 performs the appropriate cryptographic operations using a private key that is based on a unique seed stored in a non-volatile memory 26, such as a one-time programmable (OTP) memory. For this purpose, processor 24 may comprise a microprocessor, which is programmed in firmware to carry out an approximated expansion process, such as the approximated LLL process that is described below. Alternatively or additionally, processor 24 may comprise hard-wired or programmable logic circuits that are arranged to execute a part or all of the approximated expansion process. When the private key is needed, processor 24 recovers the private key by expanding the stored seed using the approximated expansion process. The recovered key may then be held temporarily in a volatile memory 28, such as random access memory (RAM), used by the processor. The seed itself is considerably smaller than the complete private key, thus reducing the required size of non-volatile memory 26.

Typically, processor 24 computes the private key at some time after the OTP memory has been programmed. For example, when a user of device 22 chooses an encrypted broadcast to receive and play on the device, the user input may invoke the instruction to the processor to generate the required private key. As another example, the start-up sequence of device 22 when the device is powered on may include an instruction to processor 24 to generate the private key in preparation for use. As noted above, the private key may be held in volatile memory 28 while device 22 is operating. Alternatively, the private key may be stored, typically in encrypted form, in a flash memory.

To maintain data security, each device 22 typically has its own, unique seed (typically a number, also referred to as a seed value). The seed is programmed into non-volatile memory 26 by a programming unit 32, such as an OTP memory programmer, at the factory. Each seed is chosen by a computer 34. Computer 34 tests each such seed before programming by attempting to expand the seed into the private key using the same approximate expansion process that processor 24 is configured (by firmware or logic arrangement) to carry out. Unlike processor 24, computer 34 is typically a powerful workstation or server, which is capable of choosing and testing many seeds at high speed. The computer is typically programmed to carry out these functions in software, which may be downloaded to the computer in electronic form, over a network, for example, or may, alternatively or additionally, be stored in tangible computer-readable storage media, such as optical, magnetic, or electronic memory media.

Figure 2:
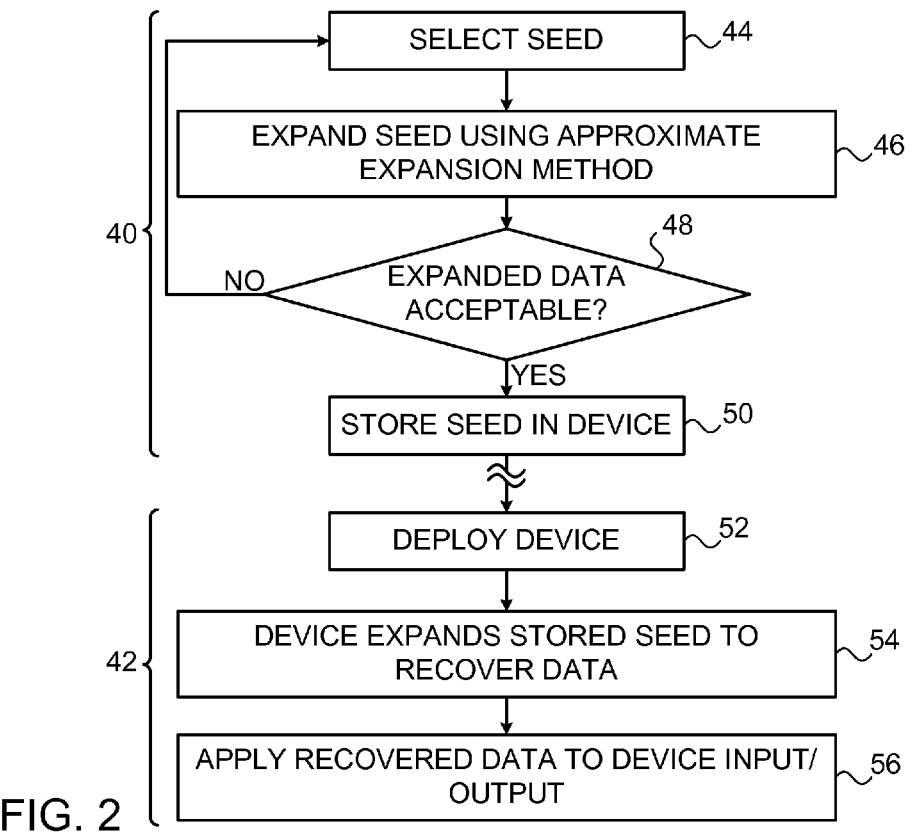
FIG. 2 is a flow chart that schematically illustrates a method for encoding and expanding data values, in accordance with an embodiment of the present invention.

FIG. 2 is a flow chart that schematically illustrates the operation of the elements of system 20, in accordance with an embodiment of the present invention. The operation is in two stages, which are sequential but are typically separate and independent in time:

A programming stage 40, in which computer 34 chooses the seed value and programming unit 32 programs this value into non-volatile memory 26; and An application stage 42, in which device 22 uses the seed value in order to recover and use the actual key.

The key is referred to in the figure as "data," to emphasize the fact that the approximated expansion process performed by processor 24 may be applied to recover an output data value generally and is not limited to generation of cryptographic keys.

In programming stage 40, computer 34 selects a trial seed value, at a seed selection 44. The seed may simply be a random binary number of a certain length, or it may be chosen according to other criteria, such as those described in the above-mentioned U.S. Pat. No. 7,340,606. The computer then tests the key by expanding it using the same approximated expansion method as will be used by processor 24, at an expansion step 46. For example, the computer (and the processor) may use the LLL-based expansion process that is described in U.S. Pat. No. 7,340,606, except that the conventional form of the LLL algorithm that is used in this patent is replaced with an approximated form of the algorithm, such as the form that is described below.

Computer 34 checks the results of this approximated expansion against one or more output data criteria, at an expansion checking step 48. For example, in the case of the approximated LLL algorithm, the computer may verify that the algorithm actually converges for the chosen seed, rather than possibly getting stuck in an endless loop. Additionally, when the approximated LLL algorithm does converge, the computer may evaluate the resulting vector basis to make sure that it approximates the shortest vector basis to within some predetermined margin. For this purpose, the computer may, for instance, perform a full LLL expansion of the seed and compare the results to those of the approximated LLL algorithm. The computer typically verifies that the computation of the approximated algorithm will result in a prime number of the required length and may compute coefficients needed to transform the actual computational result into such a prime number. If the results of the approximated expansion do not meet the required criteria, the computer discards the current seed value and returns to step 44 to choose a new seed and restart the process.

Computer 34 instructs programming unit 32 to store the current seed (and possibly the accompanying coefficients) in non-volatile memory 26 of device 22, at a programming step 50. The computer may instruct programming unit 32 to store other data in memory 26, as well. For example, in the LLL-based method of seed expansion described in U.S. Pat. No. 7,340,606, the prime factor q is computed as a linear combination of certain coordinates of the vectors in the basis that is generated by the LLL algorithm, with certain respective coefficients applied to these coordinates. Computer 34 may compute and store these coefficients together with the seed value in memory 26.

In application stage 42, device 22 is deployed for application by a user, at a deployment step 52. The user may be, for example, a subscriber who pays to receive content from the encrypted broadcast system described above. Processor 24 reads the stored seed value from memory 26, and then applies the predetermined approximated expansion process (such as approximated LLL) to the seed value, at a key recovery step 54. Because computer 34 has already tested the approximated expansion process on this seed, step 54 is certain to converge to an output value to meets the desired criteria, even though the approximated algorithm in and of itself offers no such general guarantee.

After recovering the key in this fashion, processor applies the key in a cryptographic operation associated with input and/or output of data via interface 30, at a key application step 56. For example, as noted above, the processor may apply the key in decrypting data received from a server and/or in generating a digital certificate for transmission to the server.

Figure 3:
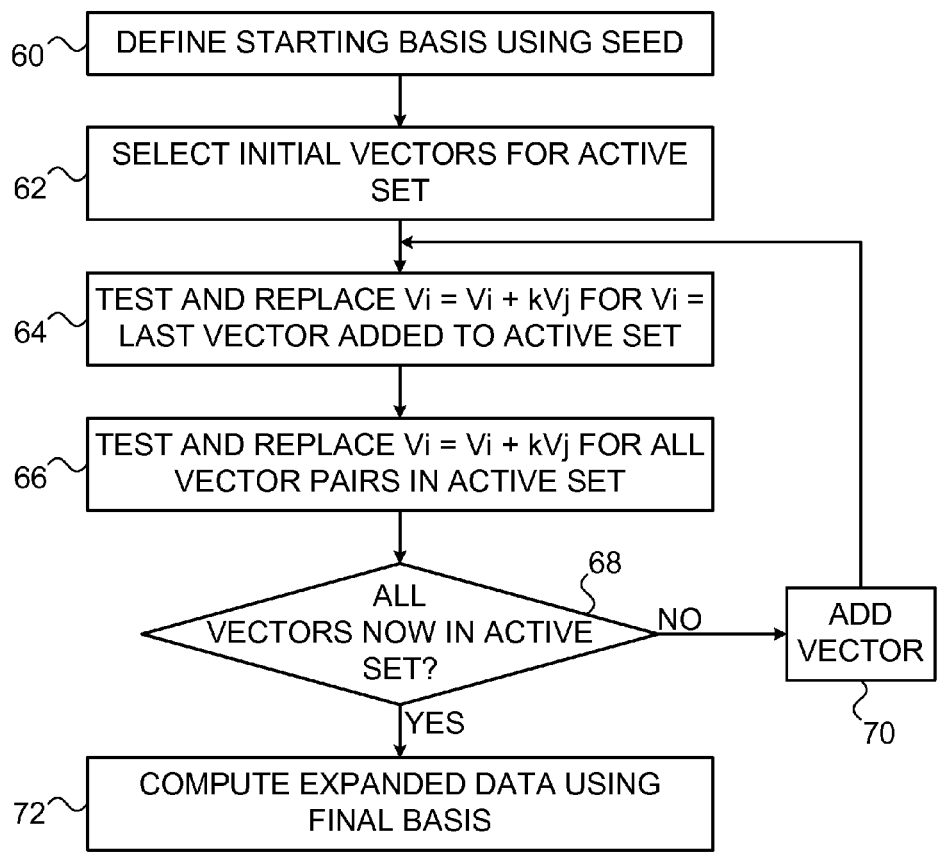
FIG. 3 is a flow chart that schematically illustrates a method for expanding a seed using an approximated lattice reduction process, in accordance with an embodiment of the present invention.

FIG. 3 is a flow chart that schematically illustrates a method for expanding a seed using an approximated LLL lattice reduction process, in accordance with an embodiment of the present invention. This method may be used, for example, at steps 48 and 54 in the method of FIG. 2.

To begin the expansion process, processor 24 (or alternatively, computer 34) defines a starting lattice based on the seed stored in memory 26, at a basis definition step 60. The lattice may be defined, for example, in terms of a set of vectors, such as the set of k+2 vectors that is shown in FIG. 1 of U.S. Pat. No. 7,340,606, and whose details are described in the text of the patent. The processor chooses two of the vectors to make up the initial "active set" for basis reduction, at an initial vector selection step 62. The subsequent steps of the method are carried out on the current active set, and are then repeated iteratively while adding successive vectors to the active set until all of the vectors are covered.

In each iteration, processor 24 first attempts to replace the vector that was last added to the active set, $v_i$, with a new vector $v_i-kv_j$ that will give a shorter basis, at a last vector replacement step 64. The value k is the closest integer to $<v_i, v_j>/<v_j, v_j>$, wherein $<,>$ represents the scalar product. This step attempts to orthogonalize the vectors in the basis, so that the scalar products between the vectors are minimized. The processor monitors the scalar products between the pairs of vectors in the active set, and terminates step 64 when the minimal scalar product has not changed over a certain number of vector replacements, such as thirty replacements.

Processor 24 then repeats the replacement process of step 64 over all vectors in the active set, at a full vector replacement step 66. In step 66, in other words, the processor attempts to replace $v_i$ with $v_i-kv_j$ for all vectors $v_i$ in the active set, and not only the last-added vector.

During steps 64 and 66, processor 24 does not attempt to change the order of the vectors in the basis, in contrast to the accepted LLL algorithmic flow described above.

In order to decide which replacement operation $v_i=v_i-kv_j$ to perform next, processor 24 may calculate all scalar products $<v_i, v_j>$, wherein during step 64 $v_i$ is the last vector added to the active set, whereas during step 66 $v_i$ runs over all vectors in the active set. At both steps $v_j$ runs over all vectors of the active set. The processor then finds the index j for which $<v_i, v_j>/<v_j, v_j>$ has the maximal absolute value, and sets k be the closest integer to this value. The processor uses this index j and factor k in the next vector replacement, unless this choice will result in an operation that effectively cancels the previous operation (i.e., for given i and j, $v_i=v_i-kv_j$ is not permitted immediately after $v_i=v_i+kv_j$).

After each iteration through steps 64 and 66, processor 24 checks whether there are any vectors remaining to be added to the active set, at a set checking step 68. If so, the processor adds the next vector to the active set, at a set growing step 70, and then returns to step 64 for the next iteration. Once iteration over all vectors has been completed, the processor uses the final, reduced basis in computing the desired, expanded output data value (step 72). This data value may be equal to one of the coordinates of one of the vectors in the final basis, for example, or may otherwise be derived by performing a certain mathematical operation (such as a weighted sum, as in U.S. Pat. No. 7,340,606) on one or several of the coordinates.

For more efficient computation in steps 64 and 66, instead of calculating the quotient $<v_i, v_j>/<v_j, v_j>$, processor 24 may calculate the difference d in bit positions of the most significant bits in $<v_i, v_j>$ and in $<v_j, v_j>$, and then use $k=2^d$ or $k=-2^d$ depending on whether $<v_i, v_j>$ is positive or negative. ($<v_j, v_j>$ is always positive.)

Additionally or alternatively, to reduce memory and computational power required in calculating $<v_i, v_j>$, processor 24 may take into account only a most significant part of the numbers involved, such as the most significant 256 bits of each coordinate of the vectors. As the algorithm proceeds through its iterations, the number of bits in the coordinates of the vectors is expected to decrease. It may therefore happen that the most significant parts of the coordinates used to calculate the scalar products contain no or too few significant bits. To remedy this problem, the processor may change the starting (most significant) bit position from which the bits in the most significant part are counted as the iterations proceed.

Another approach to reducing memory requirements may be used if in the starting basis defined at step 60, the respective i-th coordinates in all vectors have a common divisor d (which maybe a power of two, as in the basis shown in FIG. 1 of U.S. Pat. No. 7,340,606). This divisibility property is preserved by the LLL algorithm and by the approximated version of the algorithm described above. In this case, processor 24 may store the coordinate values divided by d, rather than the longer coordinate values themselves.

If the starting lattice basis is of the specific type shown in FIG. 1 of U.S. Pat. No. 7,340,606, there are a number of other ways to reduce memory an d computational requirements. For example, the last coordinate of all vectors in the matrix can be omitted, as long as processor 24 skips step 66 in the final iteration following addition of the last vector to the active set. In addition, the second-to-last coordinate of all the vectors can be ignored when calculating the scalar products.

As noted earlier, although the embodiments described above relate specifically to LLL, the principles of the present invention may be applied to other types of numerical problems and algorithms. For example, in an alternative embodiment, small seed values may be stored and used in finding numerical solutions of differential equations. In a typical embodiment of this sort, a computationally-weak device is required to numerically solve a differential equation, subject to device-specific parameters and/or boundary conditions. These device-specific data are stored in the form of seed values in a memory of the device, such as an OTP memory. For certain choices of the device-specific data, the numerical solution of the differential equation may not work (for instance, because it does not give an approximation of the solution with a predefined precision). A strong computer therefore precalculates numerical solutions using different sets of parameters and/or boundary conditions, in a process of trial-and-error, in order to find seed values that will ensure the required quality of the numerical solution.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for computation, comprising:
  a processor, which is configured to expand input seed values into respective output data values using an approximated expansion process such that the output data values are not guaranteed to satisfy a required output data criterion; and
  a non-volatile memory, which is programmed to store a seed value, which is selected so that an output data value generated by the processor by application of the approximated expansion process to the stored seed value yields an output data value that satisfies the required output data criterion;
  wherein the approximated expansion process comprises finding a vector basis of a lattice using the seed value, and deriving the output data value from the vector basis by applying a modified Lenstra-Lenstra-Lovasz (LLL) algorithm to the lattice without swapping two vectors of the basis.

2. The apparatus according to claim 1, wherein the output data value is at least a part of a cryptographic key, and wherein the processor is configured to perform a cryptographic operation on a data item using the cryptographic key.

3. The apparatus according to claim 2, wherein the cryptographic operation comprises generating a digital certificate for authenticating the apparatus.

4. The apparatus according to claim 2, wherein the stored seed value is selected so that the output data value is a prime number of a predetermined length.

5. A method for computation, comprising:
  configuring a processor to expand input seed values into respective output data values using an approximated expansion process such that the output data values are not guaranteed to satisfy a required output data criterion;
  selecting a seed value so that an output data value generated by the processor by application of the approximated expansion process to the selected seed value will yield an output data value that satisfies the required output data criterion; and
  storing the selected seed value in a non-volatile memory to be accessed by the processor;
  wherein the approximated expansion process comprises finding a vector basis of a lattice using the seed value, and deriving the output data value from the vector basis by applying a modified Lenstra-Lenstra-Lovasz (LLL) algorithm to the lattice without swapping two vectors of the basis.

6. The method according to claim 5, wherein the output data value is at least a part of a cryptographic key, and wherein the processor is configured to perform a cryptographic operation on a data item using the cryptographic key.

7. The method according to claim 6, wherein the cryptographic operation comprises generating a digital certificate for authenticating a device containing the processor.

8. The method according to claim 6, wherein the stored seed value is selected so that the output data value is a prime number of a predetermined length.

9. The method according to claim 5, wherein selecting the seed value comprising running the approximated expansion process using a trial seed value on a computer other than the processor so as to generate a trial result, and testing the trial result to verify that it satisfies the required output data criterion before storing the trial seed value as the selected seed value in the non-volatile memory.

10. A system for computation, comprising:

a programming unit, which is configured to program a non-volatile memory in a device that includes a processor configured to read an input seed value from the non-volatile memory and to expand the input seed value into an output data value using an approximated expansion process such that the output data value is not guaranteed to satisfy a required output data criterion; and a computer, which is configured to select a seed value so that the output data value generated by the processor by application of the approximated expansion process to the selected seed value will satisfy the required output data criterion, and to cause the programming unit to store the selected seed value in the non-volatile memory of the device;

wherein the approximated expansion process comprises finding a vector basis of a lattice using the seed value, and deriving the output data value from the vector basis by applying a modified Lenstra-Lenstra-Lovasz (LLL) algorithm to the lattice without swapping two vectors of the basis.

11. The system according to claim 10, wherein the output data value is at least a part of a cryptographic key, and wherein the processor is configured to perform a cryptographic operation on a data item using the cryptographic key.

12. The system according to claim 11, wherein the cryptographic operation comprises generating a digital certificate for authenticating a device containing the processor.

13. The system according to claim 11, wherein the stored seed value is selected so that the output data value is a prime number of a predetermined length.

14. The system according to claim 10, wherein the computer is configured to run the approximated expansion process using a trial seed value so as to generate a trial result, and to test the trial result to verify that it satisfies the required output data criterion before storing the trial seed value as the selected seed value in the non-volatile memory.

* * * * *